US008054328B2

(12) United States Patent
Shiue et al.

(10) Patent No.: US 8,054,328 B2
(45) Date of Patent: *Nov. 8, 2011

(54) VIDEO PHONE COMMUNICATION SYSTEM AND METHOD THEREFOR

(75) Inventors: Gwo-Hwa Shiue, Taipei (TW); Ming-Hui Huang, Taipei (TW); Han Cheng, Taipei (TW)

(73) Assignee: Inventec Multimedia & Telecom Corporation, Taipei (TW)

( * ) Notice: Subject to any disclaimer, the term of this patent is extended or adjusted under 35 U.S.C. 154(b) by 1470 days.

This patent is subject to a terminal disclaimer.

(21) Appl. No.: 11/468,663

(22) Filed: Aug. 30, 2006

(65) Prior Publication Data

US 2008/0055396 A1    Mar. 6, 2008

(51) Int. Cl.
H04N 7/14    (2006.01)
(52) U.S. Cl. .................................. 348/14.05; 455/41.3
(58) Field of Classification Search ................ 348/14.01
See application file for complete search history.

(56) References Cited

U.S. PATENT DOCUMENTS

| 6,094,213 A | 7/2000 | Mun et al. |
| 6,400,814 B1 | 6/2002 | Adams |
| 7,542,066 B2 | 6/2009 | Ezumi et al. |
| 7,657,227 B2 | 2/2010 | Doan et al. |
| 2008/0055394 A1* | 3/2008 | Shiue .......................... 348/14.01 |

FOREIGN PATENT DOCUMENTS

JP    110074952    3/1999

OTHER PUBLICATIONS

U.S. Appl. No. 11/465,404, Mail Date May 17, 2010, Office Action.
U.S. Appl. No. 11/465,404, Mail Date Oct. 12, 2010, Final Office Action.

* cited by examiner

*Primary Examiner* — Curtis Kuntz
*Assistant Examiner* — Maria El-Zoobi
(74) *Attorney, Agent, or Firm* — Workman Nydegger

(57) ABSTRACT

A video phone communication system and method therefor are provided. The system includes a master phone device and at least one extension phone device. The master phone device is connected to the extension phone device through a wired or wireless communication way. The master phone device is used to conduct a voice/image communication with a communication partner, and transmit the voice/image signals of the communication partner to an extension phone device through the wired or wireless communication way. Thus, the image of the communication partner is displayed on a display of the extension phone device. Through the application of the video phone communication system and method of the application, the contents and range of the image displayed can be increased, thus fulfilling the requirements of mobility and multi-party communications in the phone communication.

13 Claims, 4 Drawing Sheets

VIDEO PHONE COMMUNICATION SYSTEM AND METHOD THEREFOR

BACKGROUND

1. Field of Invention

The invention relates a phone device and method, and in particular to a video phone communication system and method therefor.

2. Related Art

Currently, through equipping an imaging device on a communication terminal, a phone device for capturing an image and making a video call appears, that is, a video phone. The video phone is characterized in shooting and imaging the pictures of calling and called parties through an image capturing device installed therein, and then displaying the images on a built-in screen, such that both parties can see each other while talking.

However, as the video phone has been widely used, a demanding for mobility or an extension phone also appears. Particularly when many people use the video phone at the same time, for example, during a video conference or a multi-party call, the scope of the image display is limited due to the limited screen of the video phone, thereby causing an inconvenience for making a call.

SUMMARY OF THE INVENTION

It is an object of the invention to provide a video phone communication system and method for solving the problem of the limited scope of the image display and increasing the mobility of video phone device.

To achieve the object, the invention provides a video phone communication system, including a master phone device, and at least one extension phone device. The master phone device has a communication device, a first audio/video controller, a first display, and a first interface control module. The communication device is used to perform voice/image communication with the communication partner through a network, the first audio/video controller is used to process the voice/image signals of the communication partner, the first display is used to display the image of the image signal of the communication partner, and the first interface control module is used to transmit the voice/image signals of the communication partner to the extension phone device. Moreover, the extension phone device includes a second interface control module, a second audio/video controller, and a second display. The second interface control module is used to receive the voice/image signals of the communication partner as transmitted by the first interface control module, the second audio/video controller is used to process the voice/image signals of the communication partner, and the second display is used to display the images of the communication partner.

According to one aspect of the video phone communication system of the present invention, the first interface control module and the second interface control module are connected through a wired or wireless communication way, so that signals including data, voice or image signals may be transmitted between a master phone device and extension phone device. As such, the technology utilized in the wireless communication way may include WiMax, UWB, WiFi, and Blue-tooth, while the signal communication medium utilized in the wired communication way may include a network cable, a USB transmission line, a coaxial cable, and an audio-video transmission line.

According to another aspect of the video phone communication system of the present invention, the second audio/video controller is used to process the voice/image signals of the extension phone device, the second interface control module is used to transmit the voice/image signals of the extension phone device to the first interface control module, and the first interface control module is used to transmit the voice/image signals of the extension phone device to the communication device, to proceed with the voice/image communication with the communication partner. According to the above preferred embodiment, the extension phone device further includes an input module, so that voice/image signal communication from an extension phone device to a communication partner can be activated through a master phone device. Furthermore, a video camera device is provided in the extension phone device and is used to fetch the image of the communication partner.

According to a further aspect of the invention, the first display is detachable and thus can be exchanged with the second display.

In addition, the present invention provides a video phone communication system, including a master phone device, and at least an extension phone device. The master phone device has a communication device, a first audio/video controller, a first display, and a first interface control module. In this configuration, the communication device is used to perform voice/image communication with a communication partner through a network, the first audio/video controller is used to process the voice/image signals of a communication partner, the first display is used to display an image of the communication partner, and the first interface control module is used to transmit the voice/image signals of the communication partner to the extension phone device and transmit the voice/image signals of the extension phone device to the communication partner. Moreover, the extension phone device includes a second interface control module, a second audio/video controller, and a second display. The second interface control module is used to receive the voice/image signals of the communication partner as transmitted by the first interface control module, and transmit the voice/image signals of the extension phone device to the first interface control module, the second audio/video controller is used to process the voice/image signals of the extension phone device and the communication partner, and the second display is used to display the images of the communication partner.

According to one aspect of the video phone communication system of the present invention, the first interface control module and the second interface control module are connected through a wired or wireless communication way, so that signals including data, voice or image signals may be transmitted between a master phone device and extension phone device. The technology utilized in the wireless communication way may include WiMax, UWB, WiFi, and Blue-tooth, while the signal communication medium utilized in the wired communication way may include a network cable, a USB transmission line, a coaxial cable, and an audio-video transmission line.

In addition, the present invention provides a video phone communication method, including the following steps.

Firstly, conduct voice/image communication with a communication partner through a network, by making use of a master phone device. Next, processing the voice/image signals of the communication partner by the master phone device, and displaying the image of the communication partner on a first display of the master phone device. Then, transmitting the voice/image signal of the communication partner to at least an extension phone device in a wired or wireless communication way. And finally, processing the voice/image signal of the communication partner by the extension phone device, and displaying the image of the communication partner on a second display of the extension phone device.

According to one aspect of the video phone communication method of the present invention, it further includes the step of selecting the communication partner by the extension phone device, and then conducting the voice/image communication with the communication partner by the extension phone device through the master phone device.

According to another aspect of the video phone communication method of the present invention, the technology utilized in the wireless communication way may include WiMax, UWB, WiFi, and Blue-tooth. The signal communication medium utilized in the wired communication way may include a network cable, a USB transmission line, a coaxial cable, and an audio-video transmission line.

Through the application of the video phone communication system and the method of the present invention, extension phone devices are added to the ordinary video phones for the expansion of the system, thus the contents and the range of images displayed can be increased through the displays of the added extension phone devices, and the features of mobility and multi-party communications of the video phone devices can also be realized. As such, when the video phone is utilized by a plurality of individuals, the displays of the added extension phone devices may facilitate viewing of the image of the communication partner significantly.

In addition, the extension phone device is provided with the capability of initiating phone communication, hereby selecting and realizing the voice/image communication with the communication partner through the master phone device.

Further scope of applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will become more fully understood from the detailed description given below for illustration only, and thus is not limitative of the invention, wherein.

DETAILED DESCRIPTION OF THE INVENTION

The purpose, construction, features, and functions of the invention can be appreciated and understood more thoroughly through the following detailed description with reference to the attached drawings.

Figure 1:
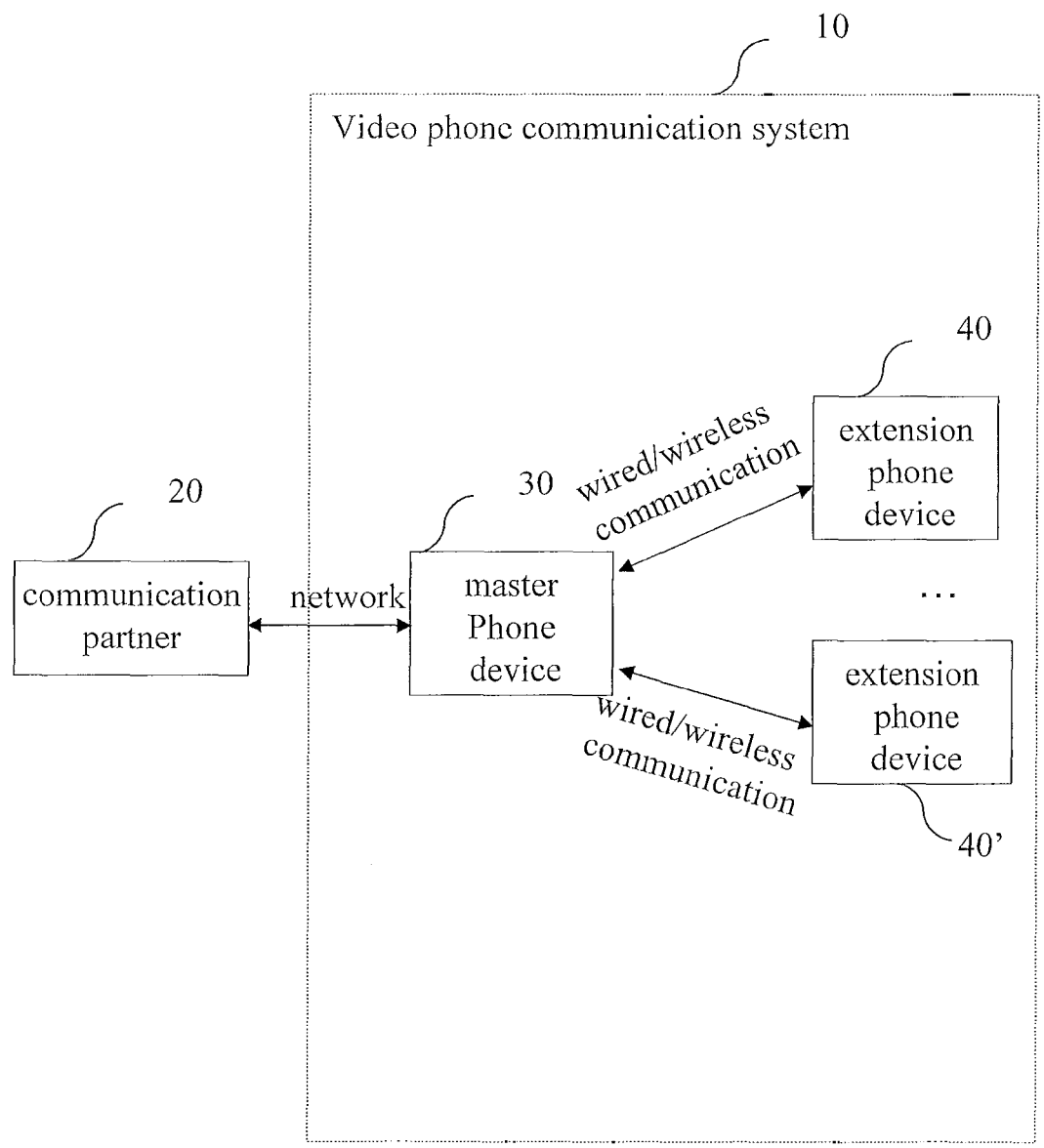
FIG. 1 is a system block diagram of a video phone communication system according to an embodiment of the invention.

As shown in FIG. 1, it is a system block diagram of a video phone communication system according to an embodiment of the present invention. In FIG. 1, the video phone communication system 10 includes a master phone device 30 and at least one of extension phone devices 40 and 40'. The extension phone devices 40 and 40' are connected to the master phone device 30 in a wired or wireless communication way, as such realizing the signal communication including data, a voice or an image between the master phone device and the extension phone device. In this configuration, the signal communication medium utilized in the wired communication way may include a network cable, a USB transmission line, a coaxial cable, a phone line, and an audio-video transmission line. The technology utilized in the wireless communication way may include WiMax, UWB, WiFi, or Blue-tooth. As such, the master phone device 30 and the extension phone devices 40 and 40' may realize phone communication with a communication partner 20 through a communication network.

It should be noted that, though the extension phone devices 40 and 40' are as shown in the drawing, however, the number of extension phone devices of the video phone communication system of the present invention is not limited to this. Thus, the number of extension phone devices connected to the master phone device 30 can be selected appropriately according to the range and number of parties or participants of the video conference. In this respect, the extension phone devices 40 and 40' are of the same structure and specification. In the following, the system structures of the master phone device and the extension phone device and the phone communication conducted therebetween will be described in detail in conjunction with FIG. 2 and FIG. 3.

Figure 2:
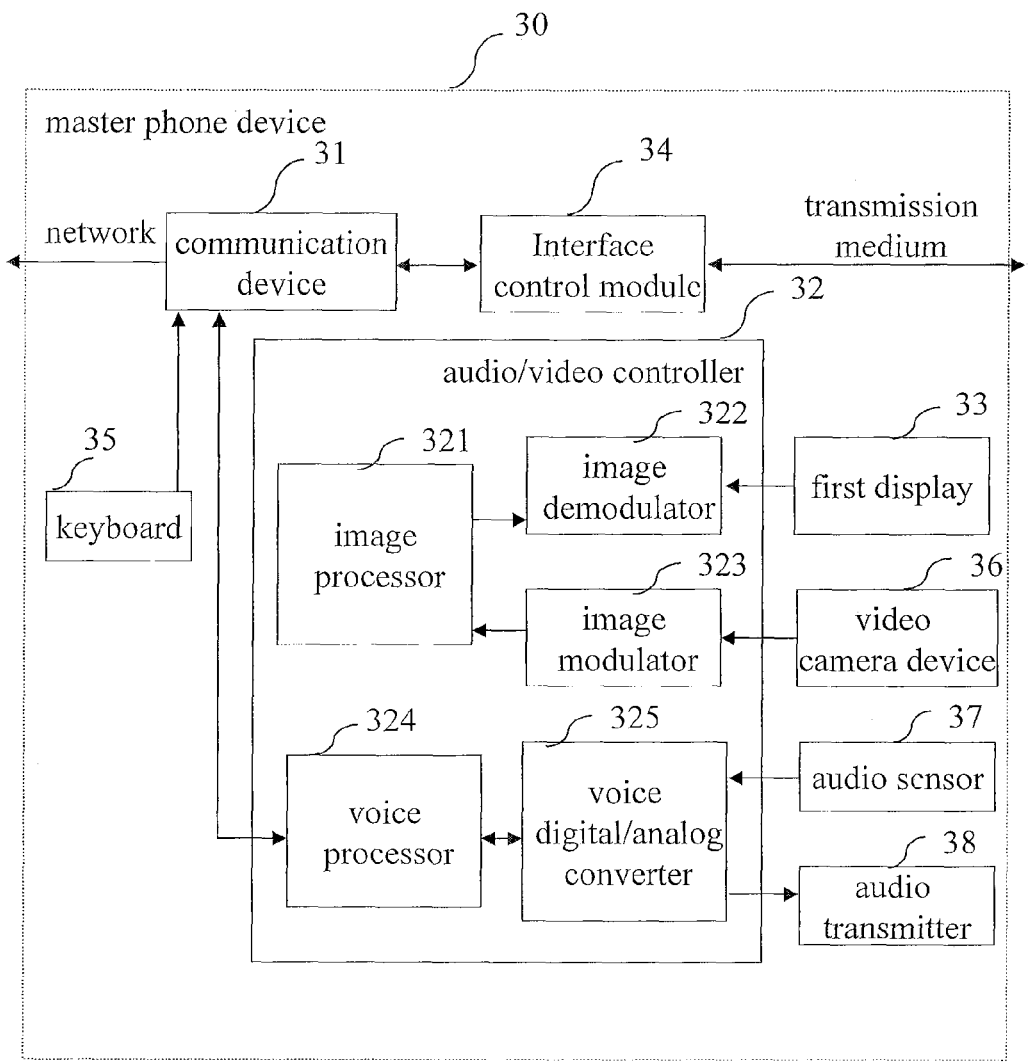
FIG. 2 is a system block diagram of a master phone device of the video phone communication system according to an embodiment of the invention.

As shown in FIG. 2, it is a system block diagram of a master phone device of the video phone communication system according to an embodiment of the present invention. In FIG. 2, the master phone device 30 includes a communication device 31, an audio/video controller 32, a first display 33, an interface control module 34, a keyboard 35, a video camera device 36, an audio sensor 37, and an audio transmitter 38. In this structure, the communication device 31 may include software/hardware devices such as: a central processing unit, a network control module, a memory module, a peripheral device control module, and a conventional phone module, so that it may proceed with the voice/image communication with a communication partner 20 through a communication network, receive the voice/image signals from an communication partner 20, or transmit the voice/image signals to a communication partner 20. The keyboard 35 of the master phone device 30 is used to dial the phone number, terminate the phone conversation, and is provided with the activation press key for other special functions, such as transferring calls, holding on the call, and searching the telephone directory.

The audio/video controller 32 is used to process the voice/image signals received or transmitted by the master phone device 30. As such, the audio/video controller 32 further includes an image processor 321, an image demodulator 322, and an image modulator 323. The image processor 321 is used to process the images, and the image demodulator 322 is used to demodulate the image signals to be output. The image demodulator 322 is connected to a first display 33, which is used to display the image of the communication partner. The image modulator 323 is connected to a video camera device 36, and is used to modulate the input voice/image signals fetched by the video camera device 36. Thus, the modulated input signals are transmitted to the communication device 31 through the image processor 321, and then transmitted to the communication partner 20 via the network to realize the video phone communication.

In addition, the audio/video controller 32 further includes a voice processor 324 and a voice digital/analog converter 325.

One end of the voice digital/analog converter 325 is connected to the voice processor 324, and the other end is connected to the audio sensor 37 and audio transmitter 38. The voice processor 324 is used to process the input or output voice signals. The voice digital/analog converter 325 is used to convert the analog voice signal input from the audio sensor 37 to the digital signals, and also convert the digital voice signals transmitted from the voice processor 324 into analog signal and then transmit them to the audio transmitter 38, thus realizing the voice communication between the calling party and the called party.

Furthermore, as shown in FIG. 2, the interface control module 34 of the master phone device 30 is connected to the extension phone device in a wired or wireless communication way, thus transmitting the voice/image signals of the communication partner 20 to the extension phone device. In the following, the connection relations between the interface control module 34 and the extension phone device will be described in conjunction with FIG. 3.

Figure 3:
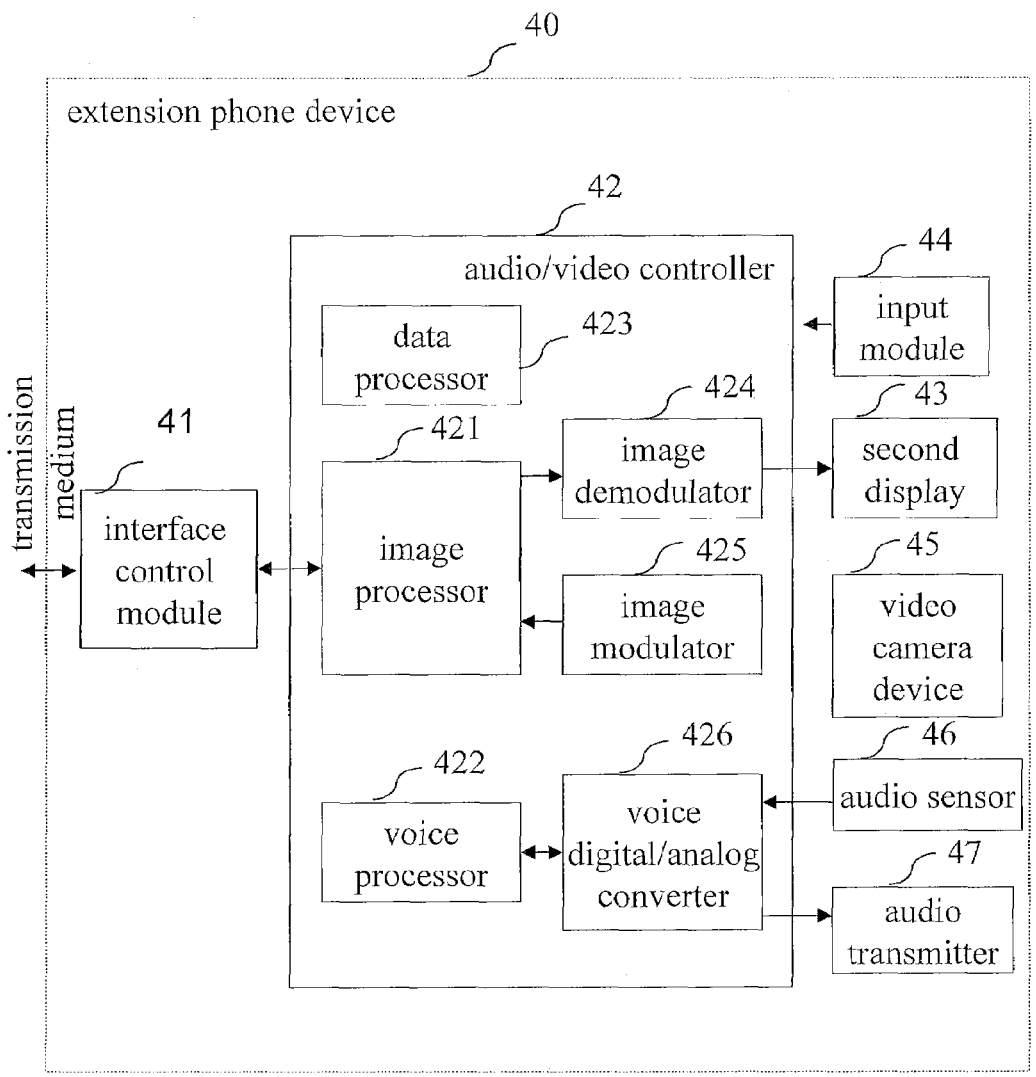
FIG. 3 is a system block diagram of an extension phone device of the video phone communication system according to an embodiment of the invention.

As shown in FIG. 3, it is a system block diagram of the extension phone device of the video phone communication system according to an embodiment of the present invention. As mentioned earlier, the extension phone devices of the invention are of the same structure, so that only one extension phone device 40 is described in FIG. 3. However, it should be noted that the number of extension phone devices utilized in the present invention is not limited to one.

In FIG. 3, the extension phone device 40 includes an interface control module 41, an audio/video controller 42, a second display 43, etc. The interface control module 41 is connected to the interface control module 34 of the master phone device in a wired or wireless communication way, hereby realizing the transmission of the signals including data, images, and a voice between the master phone device 30 and the extension phone device 40. For example, when the USB transmission line is utilized as a means of wired communication, then the interface control module 34 and interface control module 41 are both the USB related interface control modules. Thus the USB transmission line connected to the above-mentioned interface control module is used to realize the data, voice or image transmission between the master phone device 30 and the extension phone device 40. For another example, when Blue-tooth wireless communication is utilized, then the interface control module 34 and interface control module 41 are both the Blue-tooth related interface control modules, thus realizing the data, voice or image transmission between the master phone device 30 and the extension phone device 40 in a wireless communication way.

Upon receiving the data, voice or image signals of a communication partner 20 from a master phone device 30 by the interface control module 41, the received signals are then processed in the audio/video controller 42. The audio/video controller 42 includes an image processor 421, a voice processor 422, and a data processor 423. In this structure, the image processor 421 is used to process the input or output image signals, and output the processed image signals to the image demodulator 424 for demodulating the image signals. The image demodulator 424 is connected to a second display 43, so that the image information of the communication partner 20 may be displayed on the second display 43. As such, the video image of the communication partner 20 may appear simultaneously on the displays of the master phone device 30 and the extension phone device 40. In addition, the first display 33 of the master phone device 30 is detachable. Thus when the size of the first display 33 is equivalent to that of the second display 43 of the extension phone device 40, the former and the latter are exchangeable. Therefore, the display of the master phone device 30 may achieve the benefit of maximum utilization and realize its function of mobility.

The voice processor 422 is used to process the input and output voice signals, and transmit the processed voice signals to the voice digital/analog converter 426. The voice digital/analog converter 426 is used to convert the processed voice signals from the digital signal to analog signals, and output the converted signals to the audio transmitter 47, or convert the analog voice signals input from the audio sensor 46 into the digital signals, hereby realizing the voice communication. The data processor 423 is used to perform the corresponding processing of the various received data.

Moreover, the extension phone device 40 of the present invention further includes an input module 44 and a video camera device 45, so that a master phone device 30 may activate the voice/image communication between an extension phone device 40 and the communication partner. The input module 44 is capable of providing functions similar to those as provided by the keyboard 35 of the master phone device 30, such as dialing a telephone number, terminating a phone call, and other special functions such as transferring a call, holding-on a call, or serving as a telephone directory. The video camera device 45 is used to fetch the image information of the extension phone device 40, so that when an communication partner is selected through an input module 44, the image information of the extension phone device 40 is transmitted from the video camera device 45 to and modulated by the image modulator 425, and then transmitted to the master phone device 30 through the image processor 421 and the interface control module 41. Meanwhile, the voice information of the extension phone device 40 is obtained by the audio sensor 46, and then converted from the analog signals to the digital signals through the voice digital/analog converter 426, and transmitted into the interface control module 41 through the voice processor 422. At this stage, the voice/image signals are transmitted from the interface control module 41 of the extension phone device 40 to the interface control module 34 of the master phone device 30, and then transmitted to the selected communication partner through a telephone network of the pertinent communication medium.

Summing up the above, through the application of the video phone communication system of the present invention, at least an extension phone device may be added to the ordinary video phone devices to display the image of the communication partner in achieving the expansion of the system, thus the contents and the range of the image displayed can be increased through the displays of the added extension phone devices, and the features of mobility and multi-partners communications of the video phone devices can also be realized. As such, when the video phone is utilized by a plurality of individuals, the displays of the added extension phone devices may facilitate viewing of the image of the communication partner significantly.

In addition, the added extension phone device is capable of activating a communication connection, thus it may select a communication partner and realize the voice/image communication with the communication partner through the ordinary video phone device. Moreover, through a video camera device provided on the extension phone device, the existing image monitoring range can be increased.

Figure 4:
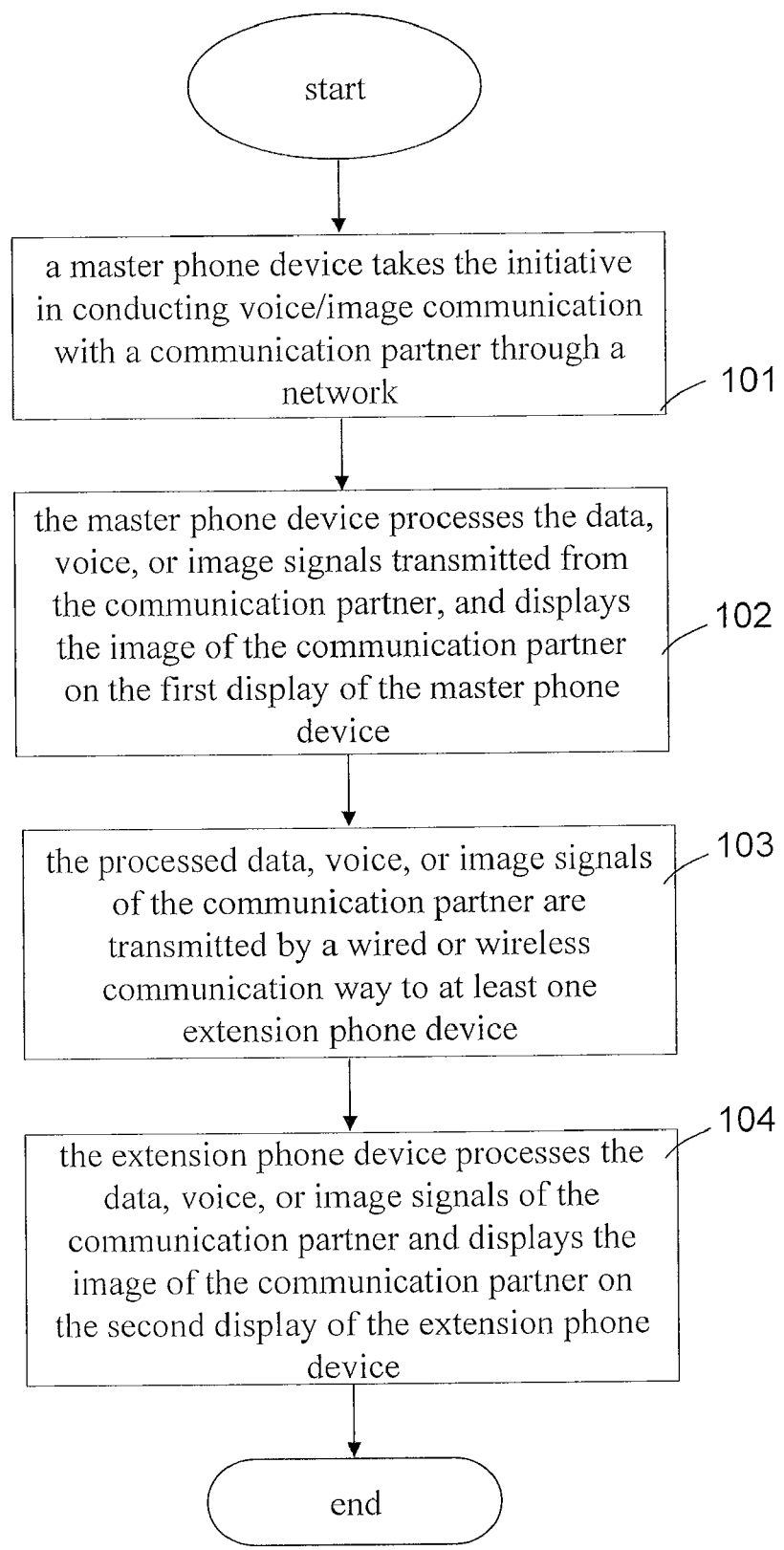
FIG. 4 is a flowchart of the steps of a video phone communication method according to an embodiment of the invention.

As shown in FIG. 4, it is a flowchart of the steps of a video phone communication method according to an embodiment of the present invention, comprising the following steps: Firstly, a phone device takes the initiative in conducting a voice/image communication with a communication partner through a network (Step 101). In this case, the phone device conducting phone conversation with the communication partner may be a master phone device or at least an added extension phone device, wherein the extension phone device is connected to the master phone device through a wired or wireless communication way. When connected by the wireless communication way, the technology utilized may include WiMax, UWB, WiFi, and Blue-tooth. Or alternatively, when connected by the wired communication way, the signal communication medium utilized may include a network cable, a USB transmission line, a coaxial cable, and an audio-video transmission line. As such, the master phone device and the added extension phone device may be utilized to activate the voice/image communication with the communication partner.

Then, upon receiving the communication request from the master phone device, the communication partner responds with data, voice, or image signals. Then the master phone device processes the data, voice, or image signals transmitted from the communication partner and displays the image of the communication partner on the first display of the master phone device (Step 102). Then, the processed data, voice, or image signals of the communication partner are transmitted by the wired or wireless communication way to at least an extension phone device (Step 103). Finally, the extension phone device processes the data, voice, or image signals of the communication partner and displays the image of the communication partner on the second display of the extension phone device (Step 104).

Furthermore, in case the communication is initiated by an extension phone device, then the extension phone device is used to select the communication partner by dialing its telephone number, and transmit the dialed telephone number to the master phone device, which may establish the phone communication with the communication partner based on the dialed telephone number. Alternately, the extension phone device may be utilized to transmit the data, voice, or image signals to the master phone device by the wired or wireless communication way. Then the master phone device is used to realize the phone communication with the communication partner through a network.

The video phone communication system and method of the present invention have advantages of enlarging the screen of the current video phone, thereby increasing the number of users and using range of the video phone, and providing a better mobility than that of prior art.

Knowing the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A video phone communication system, comprising:
a master phone device, comprising:
a communication device for performing voice/image communication with a communication partner through a network;
a first audio/video controller for processing the voice/image signals of the communication partner;
a first display for displaying the image of the image signal of the communication partner; and
a first interface control module for transmitting the voice/image signals of the communication partner to the extension phone device; and
at least one extension phone device, comprising:
a second interface control module for receiving the voice/image signals of the communication partner transmitted by the first interface control module;
a second audio/video controller for processing the voice/image signals of the communication partner; and
a second display for displaying the image of the communication partner,
wherein the first display is detachable and is equivalent to the second display, the first display and the second display being exchangeable.

2. The video phone communication system as claimed in claim 1, wherein the first interface control module and the second interface control module are connected through a wireless communication way, so that the data, voice or image signals are transmitted between the master phone device and the extension phone device.

3. The video phone communication system as claimed in claim 2, wherein the signal transmission medium of the wireless communication way is selected from a group consisting of WiMax, UWB, WiFi, and Blue-tooth.

4. The video phone communication system as claimed in claim 1, wherein the first interface control module and the second interface control module are connected through a wired communication way, so that the data, voice or image signals are transmitted between the master phone device and the extension phone device.

5. The video phone communication system as claimed in claim 4, wherein the signal transmission medium of the wired communication way is selected from a group consisting of a network cable, a USB transmission line, a coaxial cable, and an audio-video transmission line.

6. The video phone communication system as claimed in claim 1, wherein the extension phone device further includes a video camera device, used to fetch image information.

7. The video phone communication system as claimed in claim 1, wherein the second audio/video controller is used to process the voice/image signal of the extension phone device, the second interface control module is used to transmit the voice/image signal of the extension phone device to the first interface control module, and the first interface control module is used to transmit the voice/image signal of the extension phone device to the communication device, thus realizing the voice/image communication with the communication partner.

8. The video phone communication system as claimed in claim 7, wherein the extension phone device further includes an input module, used to enable the master phone device to initiate the voice/image communication between the extension phone device and a communication partner.

9. A video phone communication system, comprising:
a master phone device, comprising:
a communication device for performing voice/image communication with a communication partner through a network;
a first audio/video controller for processing the voice/image signals of the communication partner;
a first display for displaying the image of the image signal of the communication partner; and
a first interface control module for transmitting the voice/image signals of the communication partner to the extension phone device, and transmitting the voice/image signals of the extension phone device to the communication partner; and
at least one extension phone device, comprising:
a second interface control module for receiving the voice/image signals of the communication partner transmitted by the first interface control module, and transmitting the voice/image signals of the extension phone device to the first interface control module;

a second audio/video controller for processing the voice/image signals of the communication partner and the extension phone device; and a second display for displaying the image of the communication partner, wherein the first display is detachable and is equivalent to the second display, the first display and the second display being exchangeable.

10. The video phone communication system as claimed in claim 9, wherein the first interface control module and the second interface control module are connected through a wireless communication way, so that the data, voice or image signals are transmitted between the master phone device and the extension phone device.

11. The video phone communication system as claimed in claim 10, wherein the signal transmission medium of the wireless communication way is selected from a group consisting of WiMax, UWB, WiFi, and Blue-tooth.

12. The video phone communication system as claimed in claim 9, wherein the first interface control module and the second interface control module are connected through a wired communication way, so that the data, voice or image signals are transmitted between the master phone device and the extension phone device.

13. The video phone communication system as claimed in claim 12, wherein the signal transmission medium of the wired communication way is selected from a group consisting of a network cable, a USB transmission line, a coaxial cable, and an audio-video transmission line.

* * * * *